United States Patent Office 3,333,635
Patented Aug. 1, 1967

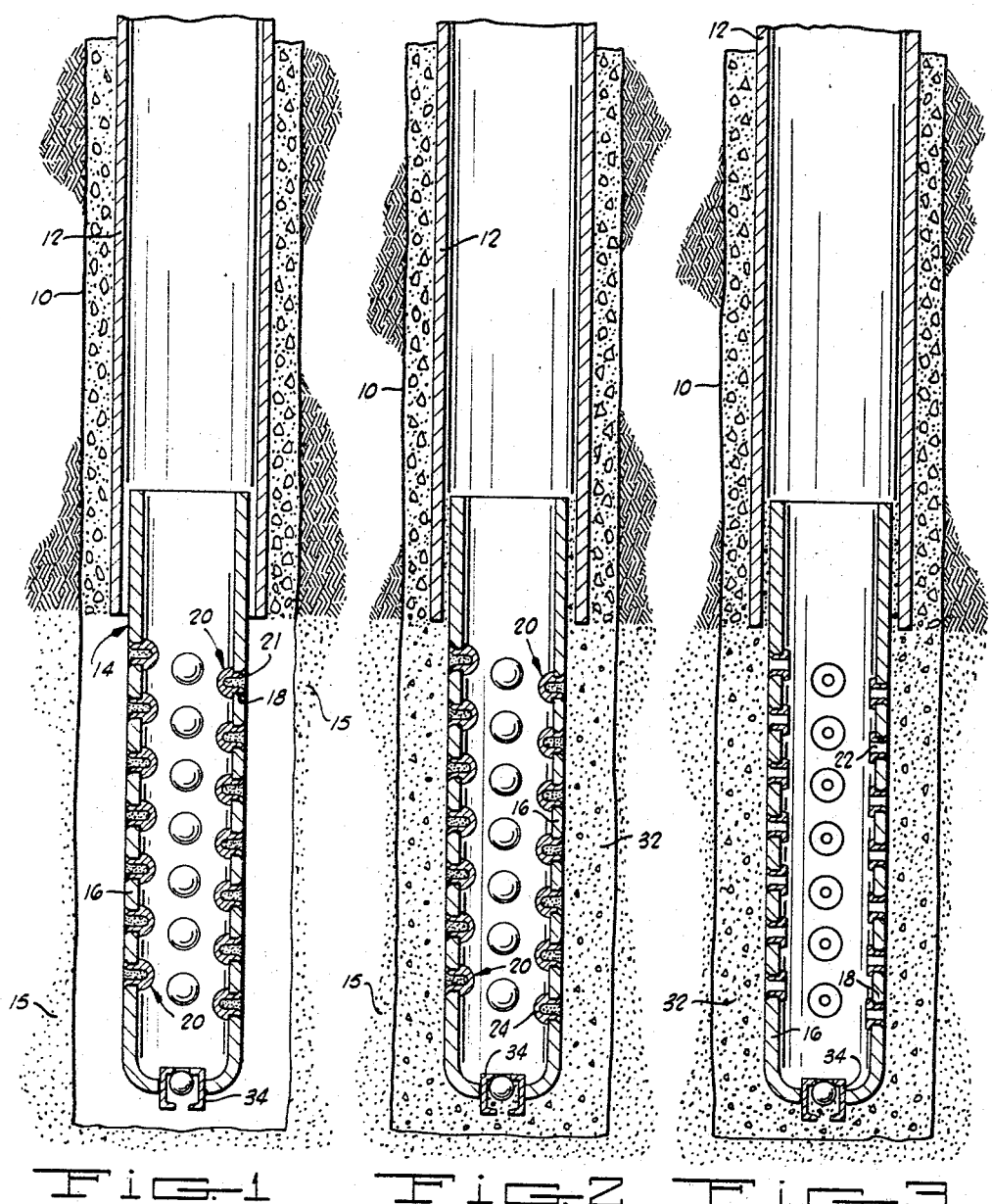

3,333,635
METHOD AND APPARATUS FOR COMPLETING WELLS
John M. Crawford, Ponca City, Okla., assignor to Continental Oil Company, Ponca City, Okla., a corporation of Delaware
Filed Apr. 20, 1964, Ser. No. 360,926
11 Claims. (Cl. 166—12)

This invention relates generally to improvements in apparatus and methods useful in completing wells. More particularly, but not by way of limitation, the present invention relates to improvements in oil and gas well cementing techniques in which a permeable cement is used in conjunction with a perforated screen or liner to convey fluids to be produced by the well into the well bore.

In oil and gas wells producing hydrocarbons from an unconsolidated, subterranean formation, it is a widespread practice to position a well screen or perforated liner in the well bore at the level of the producing formation, and to surround the liner with a permeable filter medium through which the fluids to be produced from the formation may flow into the well bore. This technique prevents the loose sand and other formation material from entering the well bore and being produced with the oil, gas or water.

The methods by which the liner and permeable filter medium, such as permeable cement or gravel, have been positioned in the well bore have varied considerably. One technique which is widely used entails first positioning an imperforate liner in the well bore adjacent the producing formation. The liner is diametrically sized to provide an annulus between the sides of the well bore and the exterior of the liner. The permeable cement or gravel is then pumped downwardly through a tubing string connected to the liner, through a suitable check valve or cement shoe at the bottom of the string and up into the annulus surrounding the liner. After the gravel or cement has been positioned around the liner, the liner is perforated by the use of projectiles or high velocity jets to provide openings through which the fluids to be produced may flow. Perforation of the liner by these techniques has the disadvantage of sometimes fracturing or chipping portions of the cement or gravel adjacent the liner in the course of the perforation so that this debris may then move into the well bore through the perforations and be produced with the production fluid, damaging pumping machinery and other equipment.

In other procedures for positioning the liner and permeable filter medium in the well bore at the level of the producing formation, the liner is pre-perforated prior to positioning it in the well bore. The liner perforations are temporarily closed with a removable material which may either be removed mechanically by impact or concussion from within the liner, or may be dissolved with a strong solvent, such as a concentrated mineral acid, to open the perforations through the liner. When the former method of removing the perforation filling material from the preformed perforations is employed, complicated and expensive tools must be frequently employed to accomplish the mechanical removal, and there is still some possibility that the cement adjacent the liner will be chipped or fractured. When a solvent such as a strong acid is used to remove the temporary plugs in the perforations, the acid may attack the cement and weaken the sealing bond between the cement and the liner.

The present invention provides a method and apparatus for positioning a perforated liner surrounded by a permeable filter medium in a well bore adjacent an unconsolidated subterranean formation from which fluids are to be produced. The method and apparatus eliminate many of the disadvantages which have characterized previously used techniques for accomplishing the disposition of the liner and cement in the well bore. Broadly described, the method of the invention comprises pre-perforating a tubular liner; temporarily closing the perforations by the use of hollow inserts positioned in the perforations, the inserts having open ends at the outer surface of the liner and closed ends projecting into the bore of the liner; positioning the liner in the well bore adjacent a producing formation; disposing a permeable filter medium around the outside of the liner between the producing formation and the external peripheral surface of the liner; and then passing a cutting tool through the bore of the tubular liner to shear off the closed ends of the hollow inserts and in this way provide a plurality of openings through the liner.

In a preferred embodiment of the invention, each of the hollow inserts is packed with a filler material which functions to prevent the permeable filter medium from entering the open end of the insert and filling the bore thereof when the filter medium is placed in position around the liner. Preferably, the material which is used to fill the bore of the hollow inserts is a material which can be easily dissolved by a mild solvent which will not attack the filter medium, or which may be easily displaced inwardly into the well bore by the inwardly acting pressure exerted by the formation fluids after the closed inner ends of the inserts have been removed. The material used to temporarily fill the hollow inserts is thus displaced from the bore of the inserts after the permeable filter medium has been placed in position around the liner, and the closed inner ends of the inserts have been cut or sheared away by a suitable tool passed through the bore of the liner.

The novel liner which is employed in practicing the method of the invention may be broadly described as an elongated, generally cylindrical member which is provided with a plurality of perforations extending through the wall thereof and spaced circumferentially and axially along the liner. In each of the perforations is positioned a hollow insert which has a bore extending therethrough and opening at the outer periphery of the liner. The inner end of each insert bore is closed by the head of the insert, which head projects radially inwardly in the bore of the liner. A packing material which is easily removable by solvent action or by fluid pressure is packed into the bore of each of the hollow inserts so as to prevent ingress of the permeable filter medium into the bore of the inserts when such filter medium is positioned around the liner. In a preferred embodiment of this apparatus, the opening into the bore of each insert which is located at the outside of the liner is beveled so as to provide a greater surface drainage area for receiving formation fluids flowing through the permeable filter medium to the outside of the liner.

From the foregoing description of the invention, it is believed that it will have become apparent that it is a major object of the present invention to provide a novel method for posiitoning a perforated liner surrounded by a permeable filter medium in a well bore opposite an unconsolidated producing formation so that the perforation of the liner is accomplished without damage to the integrity of the filter medium surrounding the liner.

Another object of the present invention is to provide a simple and economical method of opening the perforations of a pre-perforated liner where the perforations have been temporarily blocked or closed to permit a permeable filter medium to be positioned around the liner in a well bore.

A more specific object of the present invention is to provide an improved technique for positioning permeable cement around a perforated liner of the type used to admit fluids such as oil and gas to a well bore by which said fluids are produced.

Yet another object of the present invention is to provide a novel pre-perforated liner in which the perforations are temporarily closed or plugged by a means which permits the perforations to be quickly and easily opened without damaging a permeable filter medium which surrounds the liner.

In addition to the foregoing described objects and advantages, additional objects and advantages will become apparent as the following detailed description of the invention is read in conjunction with a perusal of the accompanying drawings which illustrate one embodiment of my invention.

In the drawings:

FIGURE 1 is a cross-sectional view of a well screen or liner constructed in accordance with the present invention and showing the liner as it appears when it is first positioned in a partially cased well bore which is to be lined with a permeable filter medium adjacent a producing formation.

FIGURE 2 is a cross-sectional view similar to FIGURE 1, but showing the liner surrounded by a permeable filter medium.

FIGURE 3 is a cross-sectional view similar to FIGURES 1 and 2, but showing the appearance of the liner after the temporarily blocked perforations therethrough have been opened using the method of this invention.

FIGURES 4 and 5 are enlarged cross-sectional detail views taken along the longitudinal axis of two types of inserts used to temporarily close the perforations in the liner in the manner shown in FIGURES 1 through 3.

Referring now to the drawings in detail, and particularly, to FIGURE 1, a well bore is generally designated by reference numeral 10. A casing 12 is illustrated as being positioned in the well bore 10 and is cemented in the well bore above the bottom thereof. A well screen or liner 14 is shown positioned in the open lower end of the well bore 10 adjacent an unconsolidated producing formation 15 with its upper end extending into the lower end of the casing 12. The liner 14 includes a generally cylindrical body 16 having a plurality of perforations or openings 18 formed therein (see FIGURE 3). The openings 18 may be of various shapes and arrangements, depending upon the particular application of the liner in the well, but in one embodiment of the invention are generally circular in cross-section and are spaced both axially and circumferentially from each other in the wall of the liner.

Positioned in each of the perforations 18 is a hollow insert, which in the illustrated embodiment of the invention, takes the form of a hollow rivet 20, the shape and construction of which may be better perceived by referring to FIGURE 4. The hollow inserts, however, need not necessarily be of the precise configuration of the rivets 20 shown in the illustrated embodiment of the invention, but need only conform generally to the shape of the perforations 18 through the cylindrical body 16 so as to plug or block the liner in the same general manner as that which is illustrated. For example, a hollow headed threaded bolt 23 of the type illustrated in FIGURE 5 could also be used with the externally threaded shank thereof engaging cooperating threads in the liner 14.

In the preferred embodiment of the invention which is illustrated in the drawings, each of the rivets 20 is generally circular in cross-section and has a shank 21 through which extends a bore 22. The dimension of the rivets 20 and their respective bores 22 are such that the bore extends from its open end located at the outer peripheral surface of the cylindrical body 16 to a point located radially inwardly of the inner peripheral surface of the cylindrical body. The inner end of each rivet 20 is provided with a head 24 which closes the inner end of the bore 22 and provides an annular flange or shoulder 26 which abuts the internal peripheral surface of the cylindrical body 16. The open outer end of each bore 22 is preferably tapered to an enlarged diameter as indicated by reference character 28 so that a greater amount of fluid from the producing formation can be collected and channelled through the bore to the interior of the liner 14. This bore enlargement may be produced by flaring the outer end of the rivets 20 to hold them in their respective openings 18 as shown in the drawings, or may exist independently of any enlargement of the outside diameter of the rivets, as will be the case where the rivets are merely held in position by a frictional or press fit.

The bore 22 of each rivet 20 is packed with a filler material 30 which can be easily removed from the bore either by a mild solvent which does not deleteriously attack the filter media surrounding the liner (as hereinafter described) or by the hydrostatic pressure exerted inwardly through the bore 22 by the formation fluids which surround the well bore. Materials of this type include, but are not limited to, sulfur, heavy grease, and very low melting point metallic alloys which can be removed by hot water or the like. In general, alloys having a melting point below about 500° F. can be used. These alloys are generally composed of eutectic mixtures of bismuth, tin, cadmium, indium and antimony in various combinations and percentages. One example of such an alloy is Woods' metal which has a melting point of 158° F. Whatever type of material 30 is used to fill the rivet bores 22, this material should not be chemically reactive with the filter medium which is to be disposed around the liner 14 as hereinafter described, nor should it cause a significant reduction in the permeability of permeable cement at the interface between the filler material and the cement when the latter material is used as a permeable filter medium.

*Practice of the method of the invention*

Having described the novel liner which is employed in practicing the method of the present invention, the manner in which the liner is made up and used in conjunction with a permeable filter medium will next be discussed and reference will be made to FIGURES 2 and 3. Although the liner may be employed in various uses in completing subsurface wells, it is particularly well-adapted for use in conjunction with a permeable filter medium surrounding the liner and, most particularly, with a permeable cement. It is the latter use of the liner which will be described by way of example.

In using the liner 14, the tubular body 16 is initially pre-perforated and the hollow rivets 20 are pre-packed with the removable material 30 and inserted in each of the perforations 18. The perforations 18 are thus temporarily blocked. The liner 14 is then positioned in the well bore 10 adjacent a producing zone or formation 15 using conventional tools and liner placement techniques well-understood in the art. This status of the liner is illustrated in FIGURE 1.

Once the liner 14 has been thus positioned, a permeable cement 32 is pumped by conventional cement pumping equipment (not shown) through the casing 12, the liner 14 and the check valve 34 located at the lower end of the liner. The cement 32 then moves upwardly into the annulus surrounding the cylindrical body 16 of liner 14 and fills the space between the liner and the interior wall of the well bore 10. The check valve 34 permits the complete displacement of the cement 32 from within the cylindrical body 16, and prevents it from returning into the liner upon release of the displacement pressure.

After the permeable cement 32 has been positioned around the cylindrical body 16 of the liner 14 in the position shown in FIGURE 2, it is permitted to set up to a hardened state. A suitable cutting tool (not shown) is then lowered in the well bore to the interior of the cylindrical body 16 and the head 24 of each of the rivets 20 is sheared or cut off so as to open the inner end of the respective bores 22. Preferably, the cutting tool employed cuts the heads 24 of the rivets off as nearly adjacent the inner wall of the linear 14 as possible. In moving along the inner wall of the liner 14, the cutting tool also drills out or removes any permeable cement that might be left on the inside of the liner.

After the heads 24 of the rivets 20 have been cut away to place the bores 22 thereof in communication with the interior of the liner 14, the cutting tool is removed from the cylindrical body 16 and the filler material 28 is removed from the bores 20. Removal of the filler material 28 may be accomplished through the use of a suitable solvent, i.e., one which does not attack the cement 32, or it may be removed by the inwardly acting hydraulic pressure of the formation fluids which force the filler material 28 inwardly into the well bore. With the opening or clearance of the bores 22 through the rivets 20, the method of the invention is completed and fluids may be produced from the formation 15 via the permeable cement 32, hollow rivets 20 and the tubular body 16 of the liner 14.

The foregoing description of the invention is exemplary of a preferred embodiment thereof, but is not intended to be comprehensive of all forms and embodiments which may be devised through the use of the basic principles herein described for the first time. Insofar, therefore, as various changes and modifications in the apparatus described and depicted herein, or in the steps of the described method, do not involve a departure from the basic principles upon which the invention is founded, all such innovations are deemed to be circumscribed by the spirit and scope of the invention except as the same may be necessarily limited by the appended claims or reasonable equivalents thereof.

What is claimed is:

1. A liner for use in completing wells comprising:
    an elongated tubular body having a plurality of perforations therein; and
    hollow inserts in said perforations, said inserts each having a bored shank portion and a head portion, with said head portions disposed inside said tubular body and forming a shoulder which abuts the internal peripheral surface of the tubular body and said shank portions extending through the respective perforations with the bore in each shank portion forming a tapered opening at the outer peripheral surface of said tubular body and being closed at its other end by the respective head portion.

2. A liner as claimed in claim 1 and further characterized to include a removable material loosely filling the bore of each of said inserts.

3. A liner as claimed in claim 1 wherein the bore in the shank portion of each of said inserts is filled with grease.

4. A liner as claimed in claim 1 wherein the bore in the shank portion of each of said inserts is filled with sulfur.

5. A liner as claimed in claim 1 wherein the bore in the shank portion of each of said inserts is filled with a metallic alloy melting below 500° F.

6. In a well for producing fluid from an unconsolidated subterranean formation, the improvement comprising:
    an elongated, perforated tubular body positioned in the well bore opposite said formation and defining with the formation an annulus around the tubular body;
    hollow rivets positioned in, and blocking, the perforations in said tubular body, said rivets each having a bored shank portion and a head portion, with said head portion disposed inside said tubular body, and said shank portions extending through the respective perforations with the bore in each shank portion opening at the outer peripheral surface of said tubular body and being closed at its other end by the respective head portion; and
    permeable cement in the annulus around said tubular body.

7. The improvement claimed in claim 6 and further characterized to include a removable material loosely packed in the bore of each of said rivets and abutting said permeable cement.

8. The method of completing a well to produce fluid from a subterranean formation comprising:
    traversing the formation with a bore hole;
    pre-perforating a tubular liner having a smaller diameter than the diameter of the bore hole;
    inserting hollow inserts in the perforations in the liner, said inserts having heads closing the hollow interior of the inserts and positioned interiorly of the liner;
    positioning the liner concentrically in the well bore adjacent the formation;
    disposing a permeable filter medium around the outside of the liner between the formation and the external peripheral surface of the liner; and then
    cutting off the heads of the inserts to place the hollow interior of the inserts in communication with the interior of the liner.

9. The method claimed in claim 8 and further characterized to include the step of packing the hollow inserts with an easily removable material prior to positioning the liner concentrically in the well bore.

10. The method claimed in claim 8 wherein the permeable filter medium employed is a permeable cement.

11. The method of sequentially closing, then opening, perforations in a generally cylindrical well liner to permit the liner to be emplaced in a well bore with said perforations closed, then opened to the subterranean strata around said well bore opposite said liner, said method comprising:
    inserting hollow inserts in the perforations in said liner prior to emplacing the liner in said well bore, said inserts having heads closing the hollow interior of the inserts, forming a shoulder which abuts the internal peripheral surface of the tubular body, and positioned interiorly of the liner;
    emplacing the liner in the well bore in generally coaxial alignment with the well bore;
    extending a cutting device into the cylindrical liner; and
    cutting the heads from said inserts with said cutting device to open the liner to the subterranean strata around the well bore.

References Cited

UNITED STATES PATENTS

| | | | |
|---|---|---|---|
| 958,100 | 5/1910 | Decker | 166—229 X |
| 2,288,557 | 6/1942 | Vollmer | 166—12 |
| 2,363,269 | 11/1944 | Schlumberger | 166—25 |
| 2,391,609 | 12/1945 | Wright | 166—228 |
| 2,540,123 | 2/1951 | Kinley | 166—228 X |
| 2,655,619 | 10/1953 | Neal | 175—4.55 X |
| 2,749,841 | 6/1956 | Jones | 175—4.53 X |
| 2,775,427 | 12/1956 | Leone | 175—4 X |
| 3,057,405 | 10/1962 | Mallinger | 166—25 |
| 3,075,462 | 1/1963 | Adamson | 175—4.58 |
| 3,181,608 | 5/1965 | Palmer | 175—4.52 X |

CHARLES E. O'CONNELL, *Primary Examiner.*

STEPHEN J. NOVOSAD, *Examiner.*